(12) United States Patent
Huston et al.

(10) Patent No.: US 10,771,116 B2
(45) Date of Patent: Sep. 8, 2020

(54) VIBRATING MAGNET ANTENNA

(71) Applicants: Dryver R Huston, South Burlington, VT (US); Tian Xia, South Burlington, VT (US); Dylan Burns, South Burlington, VT (US); Dan Orfeo, Essex Junction, VT (US)

(72) Inventors: Dryver R Huston, South Burlington, VT (US); Tian Xia, South Burlington, VT (US); Dylan Burns, South Burlington, VT (US); Dan Orfeo, Essex Junction, VT (US)

(73) Assignee: The University of Vermont and State Agricultural College, Burlington, VT (US)

(*) Notice: Subject to any disclaimer, the term of this patent is extended or adjusted under 35 U.S.C. 154(b) by 0 days.

(21) Appl. No.: 16/569,009

(22) Filed: Sep. 12, 2019

(65) Prior Publication Data

US 2020/0083931 A1    Mar. 12, 2020

Related U.S. Application Data (60) Provisional application No. 62/730,370, filed on Sep. 12, 2018.

(51) Int. Cl.
*H04B 5/00* (2006.01)

(52) U.S. Cl.
CPC .................. *H04B 5/0075* (2013.01)

(58) Field of Classification Search
CPC ................. H04B 5/00; H04B 5/0075
USPC ........................................ 455/41.1
See application file for complete search history.

(56) References Cited

U.S. PATENT DOCUMENTS

| | | | |
|---|---|---|---|
| 8,838,023 B2* | 9/2014 | Charrat | G06K 19/0723 455/41.1 |
| 9,400,903 B2* | 7/2016 | Wang | H04B 5/0031 |
| 9,450,649 B2* | 9/2016 | Contaldo | H04B 5/0031 |
| 2018/0269828 A1* | 9/2018 | Beck | H02S 40/44 |

* cited by examiner

*Primary Examiner* — Sonny Trinh (57) ABSTRACT

A vibrating magnetic antenna for generating reversable magnetic dipoles is provided. Soft magnetic materials are used to project the magnetic field as the magnet moves linearly between soft magnetic stators arranged in a "Y" configuration. The soft magnetic stators include a nickel-iron alloy, having high magnetic permeability. Also provided is a magnetic coupling circuit for upshifting the frequency of the magnetic field.

20 Claims, 11 Drawing Sheets

FIG. 9 a. 600 RPM (10 Hz)

FIG. 10 b. 1100RPM (18.3 Hz)

FIG. 11 c. 1700 RPM (28.3 Hz)

FIG. 12

VIBRATING MAGNET ANTENNA

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. provisional patent application 62/730,370, entitled "Vibrating Magnet Antenna", naming Dryver R. Huston as first named inventor, filed 12 Sep. 2018.

BACKGROUND

1. Field of Use

The invention relates to vibrating magnetic antennas.

2. Description of Prior Art (Background)

Magnets have a variety of commercial uses. For instance, magnets perform a variety of physical tasks by attracting ferric materials, and magnets also perform a variety of electrical tasks, such as creating an electric current in a generator or alternator or enhancing the performance of electromagnetic devices such as inductors. However, the creation of a strong magnetic field to perform these functions generally entails the use of a lame permanent magnet or a powerful electromagnet. Such magnets are often physically large and heavy, and tend to produce wide magnetic fields which can interfere with equipment near the magnet. Thus, commercial devices that include magnets must be designed around the physical size of the magnet needed to produce a desired magnetic field and around the width of the magnetic field produced.

BRIEF SUMMARY

The present invention provides a mechanical antenna that generates low frequency magnetic fields with a synchronized array of oscillating permanent magnets. The vibrating magnet array can generate low-frequency oscillating magnetic fields in a system that is much more compact and energy efficient that competing systems using electric coils. These low-frequency magnetic waves can penetrate through the earth, ocean and other challenging environments that deny traditional radio-frequency and microwave electromagnetic communications.

Another feature of the invention is vibrating magnetic antenna (VMA). The VMA includes a magnetic shuttle and a Y-configured stator assembly. The Y-configured stator assembly includes a pair of first stators and a second stator, wherein the second stator is positioned relative to the pair of first stators to form a Y-configuration. The magnetic shuttle is adapted to travel linearly between the pair of first stators and the second stator. The pair of first stators and the second stator project alternating magnetic fields dependent upon the relative position of the magnetic shuttle.

The invention is also directed towards and alternating magnetic field modulator (AMFM). The AMFM includes a vibrating magnetic array for generating the alternating magnetic field; a ferromagnetic output element; and an electrically tunable ferromagnetic coupler for coupling the alternating magnetic field to the ferromagnetic output element. The AMFM also includes a controller for controlling the electrically tunable ferromagnetic coupler.

BRIEF DESCRIPTION OF THE DRAWINGS

The subject matter which is regarded as the invention is particularly pointed out and distinctly claimed in the claims at the conclusion of the specification. The foregoing and other objects, features, and, advantages of the invention are apparent from, the following detailed description taken in conjunction with the accompanying drawings in which:

DETAILED DESCRIPTION

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

Figure 1A:
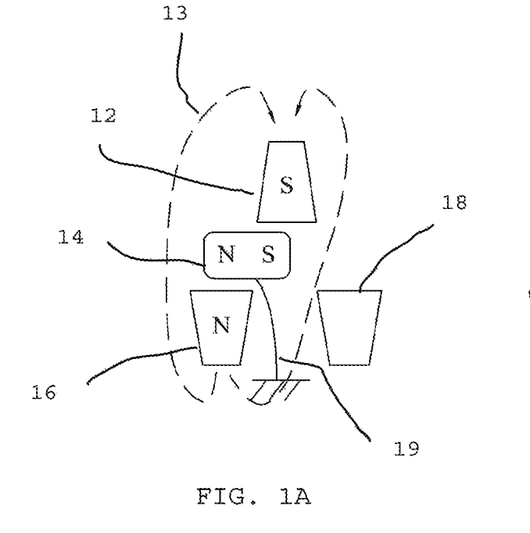
FIG. 1A-FIG. 1D is a pictorial illustration of a vibrating magnetic array in accordance with the present invention.

Referring to FIG. 1A-FIG. 1D there is shown a pictorial illustration of a vibrating magnetic array 10 in accordance with the present invention. Vibrating magnetic array 10 includes Y-stator configuration 12, 16, and 18 as shown in FIG. 1A. It will be understood that stators 12, 16, and 18 may be any suitable soft magnetic material for projecting the magnetic field 13. For example, stators 12, 16, and 18 may be a Permalloy such as a nickel-iron alloy having high magnetic permeability. Stators 12, 16, and 18 may also be a soft magnetic composite. Magnetic shuttle 14 may be any suitable permanent magnet such as, for example, a Neodymium magnet. Magnetic shuttle 14 may also be an array of suitably positioned magnets, such as a Halbach array of magnets. It will also be appreciated that magnetic shuttle 14 may comprise a plurality of magnetic shuttles looping through Y-stator configuration 12, 16, and 18.

Figure 1B:
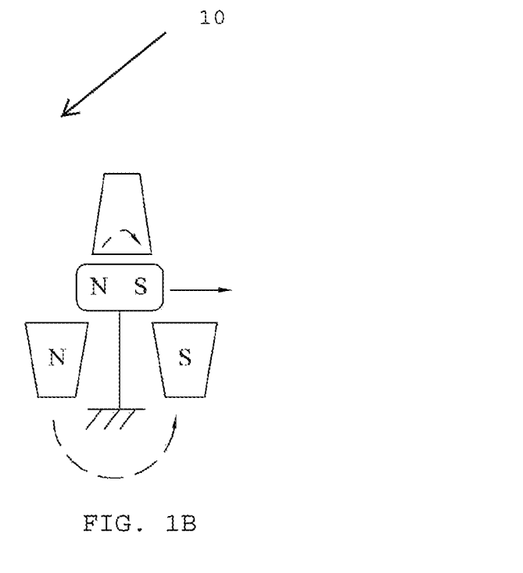
Figure 1C:
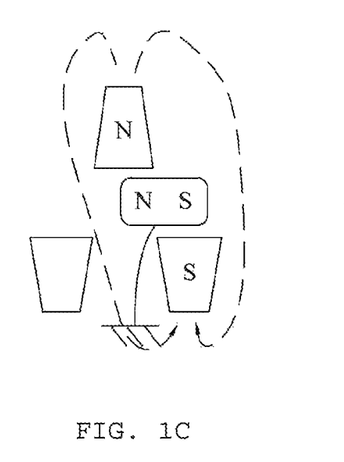

Still referring to FIG. 1A, with magnetic shuttle 14 in position shown in FIG. 1A the resulting magnetic field 13 is projected by stators 12 and 16. FIG. 1B represents magnetic shuttle 14 travelling or shuttling to the right, under the influence of shuttle power 19. It will be understood that shuttle power 19 may be any suitable shuttle power for linearly moving magnetic shuttle 14 between stators 12 and 16, 18, such as, for example an elastic spring. It will be appreciated that in the position shown in FIG. 1B the system is, near equilibrium in that the external projected magnetic field is nearly null. FIG. 1C shows the resulting magnetic field when magnet 14 is in the opposite position of FIG. 1A. It will be appreciated that the resulting projected magnetic field is opposite in polarity from the field 13 projected in FIG. 1A. FIG. 1D again shows the equilibrium field as magnet 14 traverses or shuttles back to its starting point, FIG. 1A.

Figure 1D:
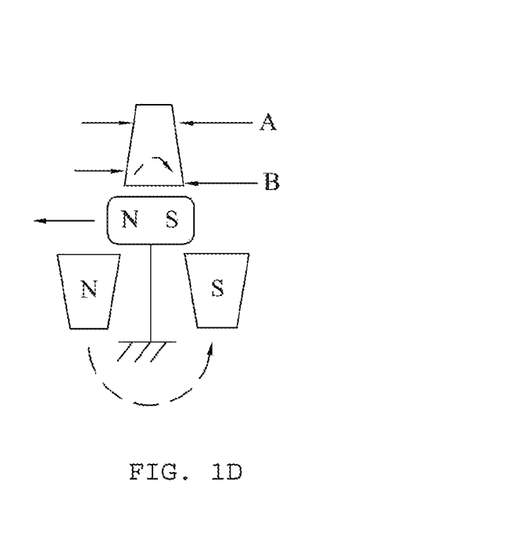

Referring also to FIG. 1D, it will be appreciated the shape and dimensions of stators 12, 16, and 18 serve to focus the resulting magnetic field if dimension A is less than dimension B. It will be appreciated that stators, 12, 16, and 18 may be any suitable shaped stators for focusing magnetic flux lines 13; such as, for example a truncated triangular shape, a truncated cone shape, or any suitable truncated octahedron shape.

It will be appreciated that the kinetic energy T of an array of N rectangular bar magnets 14 of density ρ with a length L twice the width and oscillating with an amplitude equal to L at frequency f is:

$$T = \tfrac{1}{8} N \mu L^5 (2\pi f)^2 \qquad \text{(Eq. 1)}$$

The total volume V of the magnets is:

$$V = (NL^3)/4 \qquad \text{(Eq. 2)}$$

This leads to a kinetic energy:

$$T/V = T''' = \tfrac{1}{2} \rho L^2 (2\pi f)^2 \sim (L)^2 \qquad \text{(Eq. 3)}$$

The kinetic energy requirement increases as a square of the length of an oscillator, thus minimizing this length saves significant energy even as the number of oscillators increases.

Still referring to FIG. 1A, the oscillating pattern of magnet 14 can be controlled to represent different information. For example, magnet 14 can oscillate at two distinct frequencies: where, for example, frequency f1 represents digital code "0" while frequency f2 represents digital code "1" Set a unit time interval as Tau seconds. Thus, by controlling the time duration Tau of each oscillating frequency, different digital information can be transmitted. For example, when magnet 14 oscillates at frequency 11 for 3*Tau seconds and then switches to frequency 12 for 2*Tau seconds then switches back to frequency f1 for 1*Tau second, the oscillating pattern can be interpreted as digital code "0001110". The movement of the magnet will lead to generating the magnetic field in the same pattern. Through magnetic coupling (e.g., see FIG. 6), the digital information can be transmitted remotely.

Figure 2A:
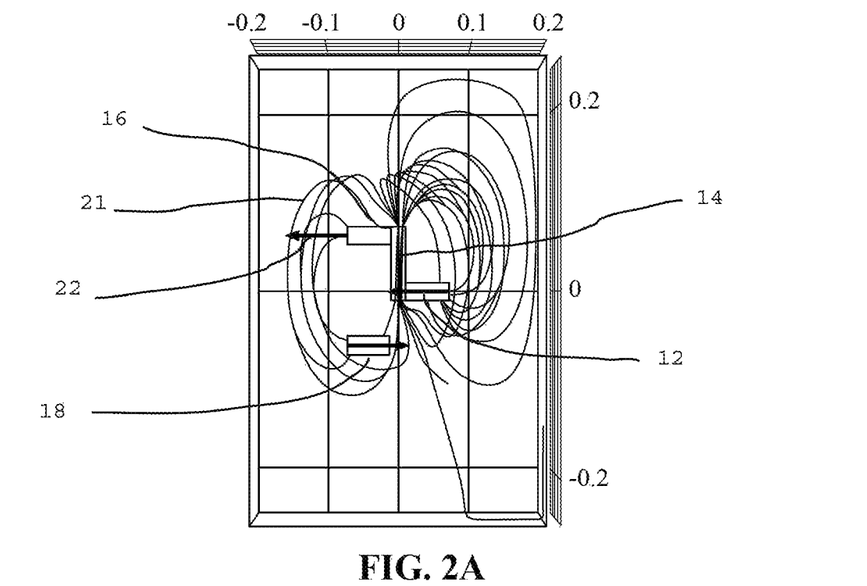
FIG. 2A-FIG. 2B is a graphical representation of a single Y stator magnetic field in accordance with the invention shown in FIG. 1.
Figure 2B:
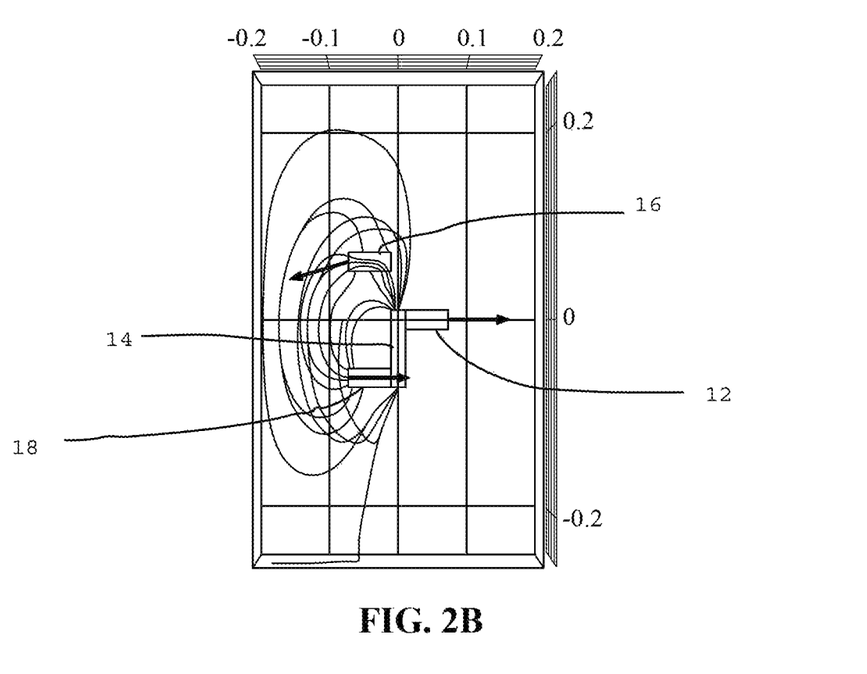

Referring also to FIG. 2A-FIG. 2B there is shown a graphical representation of a single Y stator magnetic field in accordance with the invention shown in FIG. 1. Heavy arrows 22 represent magnetic flux density vectors (B-field) and field lines 21 represent resulting magnetic field lines. It will be appreciated that for clarity not all flux density vectors and magnetic field lines are labeled.

Figure 2C:
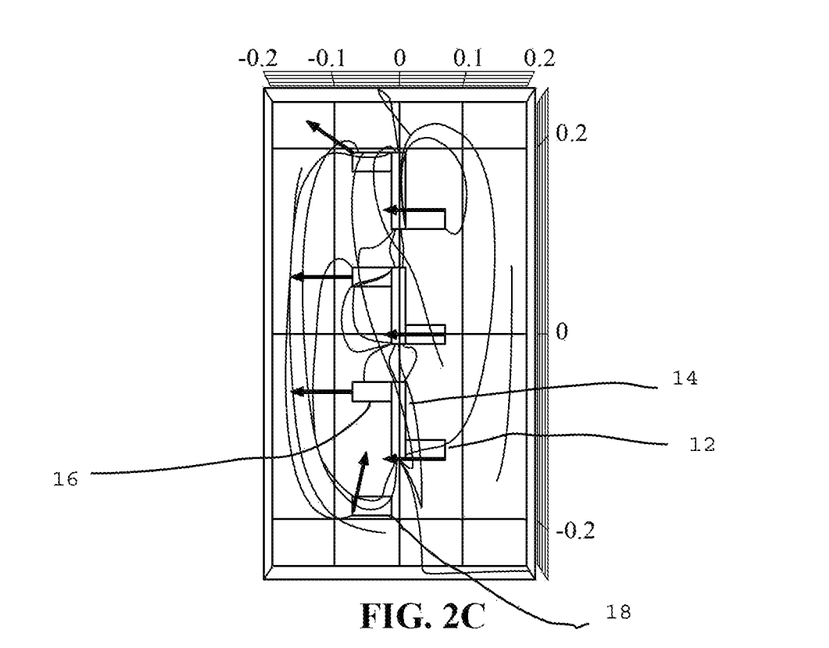
FIG. 2C-FIG. 2D is a graphical representation of a dual Y stator magnetic field in accordance with the invention shown in FIG. 1.
Figure 2D:
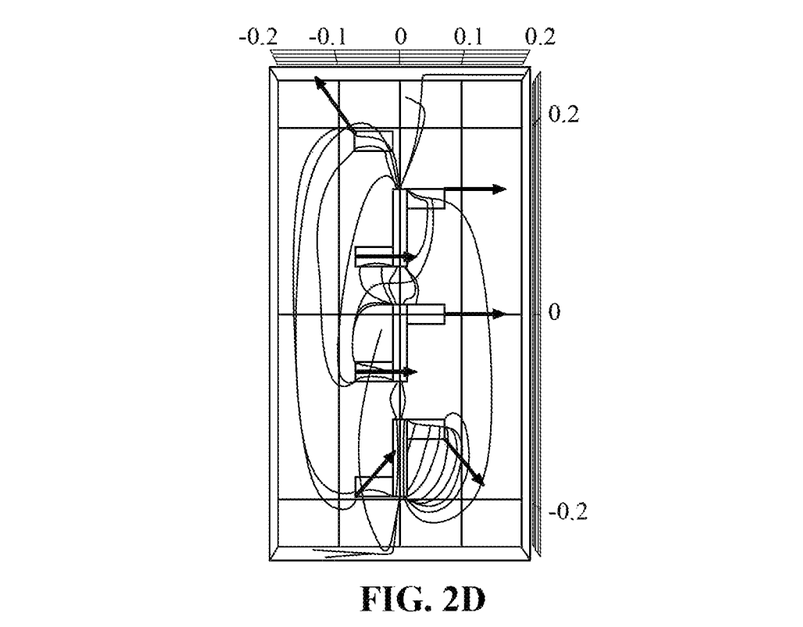

Referring also to FIG. 2C-FIG. 2D there is shown a graphical representation of the magnetic field and flux density vectors of an array of Y stator magnetic field in accordance with the invention shown in FIG. 1.

Figure 3:
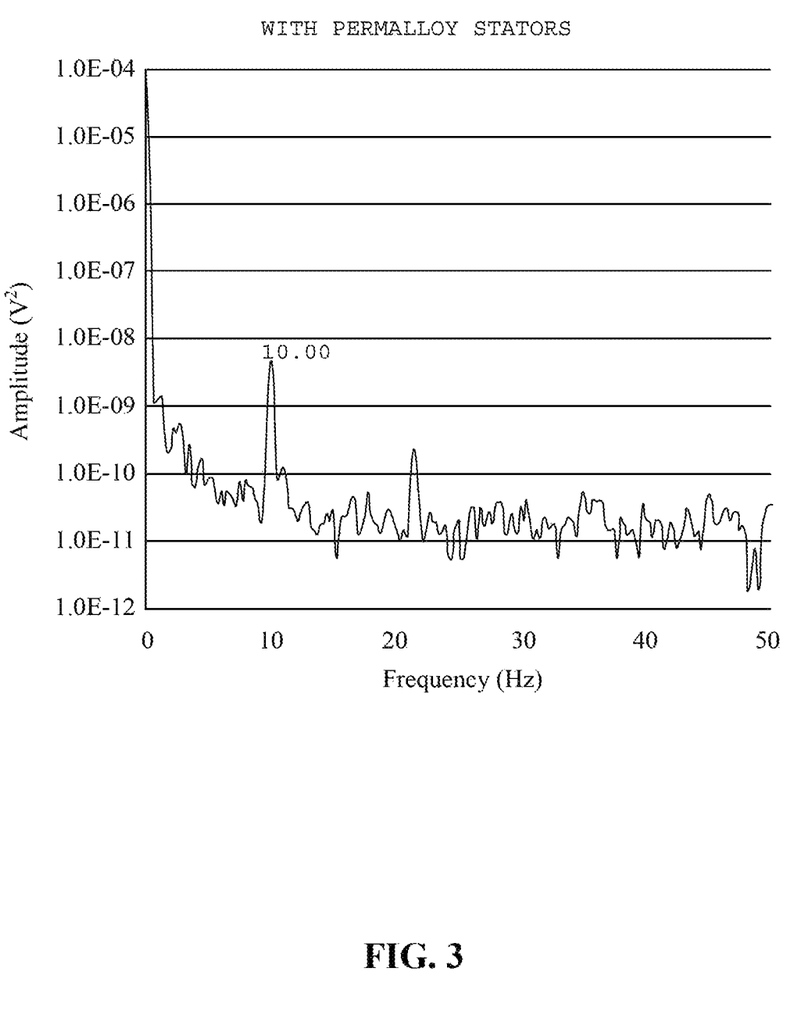
FIG. 3 is a graphical response graph of amplitude vs frequency when stators are Permalloy (PY)
Figure 4:
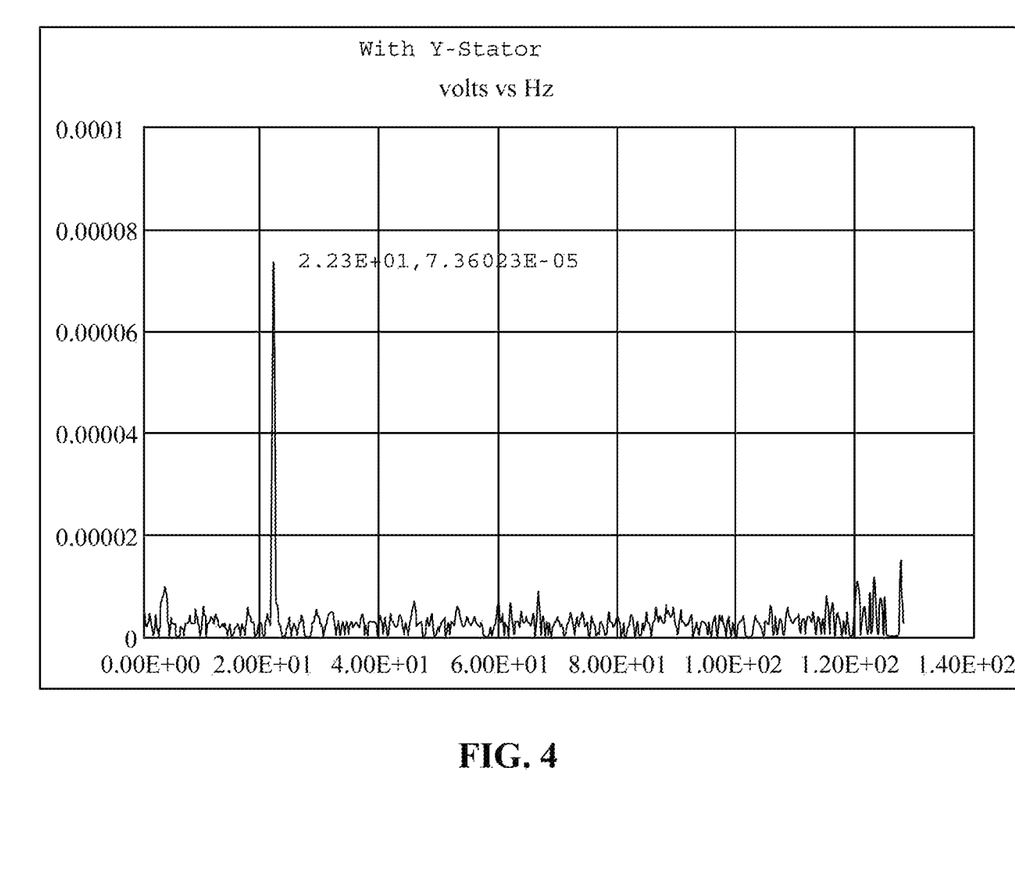
FIG. 4 is a graphical response graph of amplitude vs frequency for Y-stator configuration in accordance with the invention shown in FIG. 1.

Referring also to FIG. 3 there is shown a graphical response graph of amplitude vs frequency when stators are Permalloy (PY). Referring also to FIG. 4 there is shown a graphical response graph of amplitude vs frequency for Y-stator configuration in accordance with the invention shown in FIG. 1.

Figure 5:
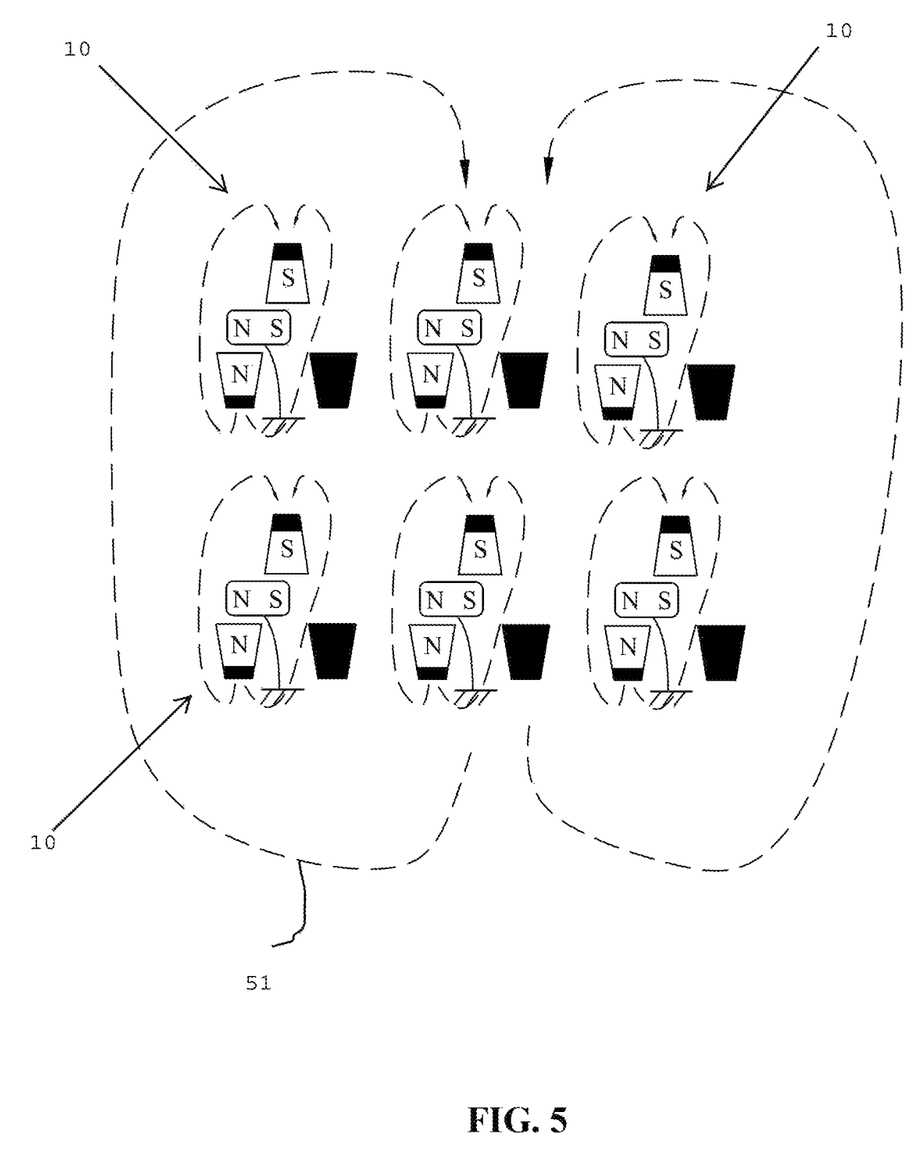
FIG. 5 is a pictorial representation of an array of Y-stator configurations.

FIG. 5 is a pictorial representation of an array of Y-stator 10 configurations. Shown in FIG. 5 is the resulting magnetic field 51 when the array of Y-stator configurations is synchronized, e.g., magnets 14 are in same positions relative to its Y-stator configuration.

Figure 6:
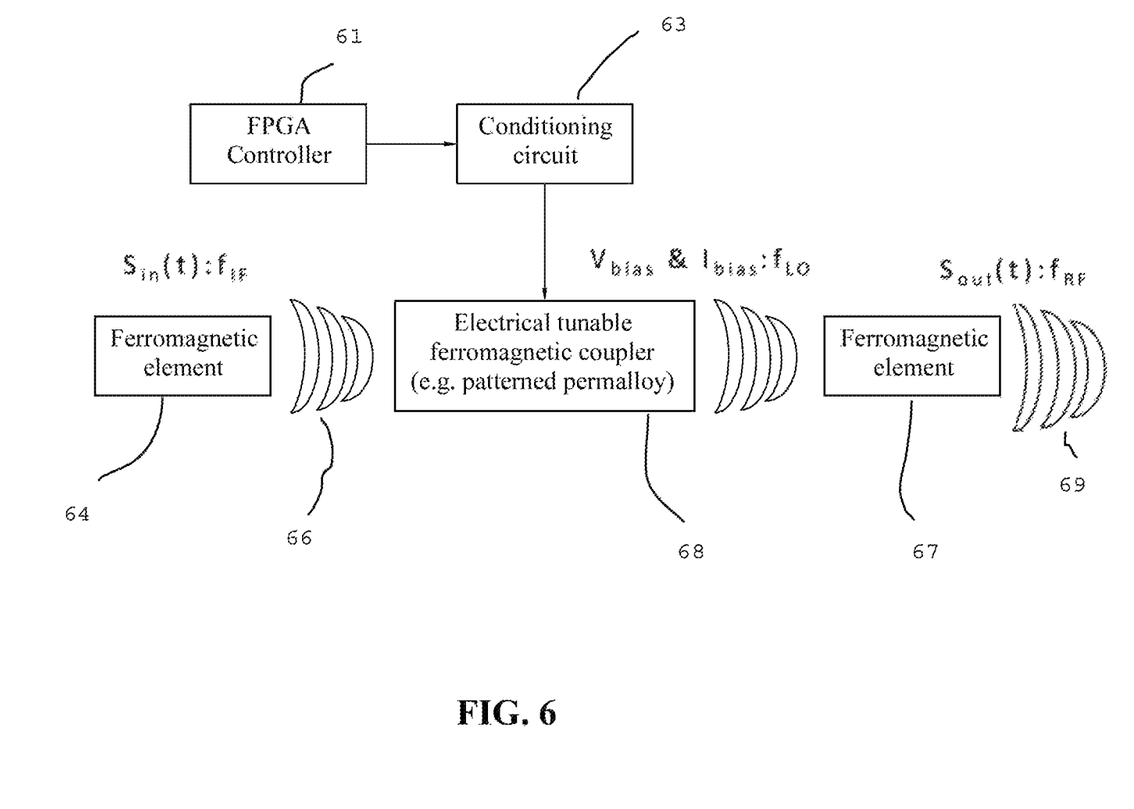
FIG. 6 is a block diagram of upshifting the magnetic frequency oscillations.

Referring also to FIG. 6 there is shown a block diagram of upshifting the magnetic frequency oscillations, e.g., 51 in FIG. 5 or 13 in FIG. 1. FIG. 1 shows that by manipulating the oscillation of the magnet 14, an oscillating magnetic field 13 can be produced. Due to the limited moving speed of the mechanical structure, the oscillating frequency of the magnetic field 13 is low, typically less than a few hundred Hz. FIG. 6 illustrates how the magnetic field 13 can be radiated and sensed by a magnetic sensor or receiver at a short distance through the magnetic coupling.

Still referring to FIG. 6, to facilitate the longer distance transmission, the low frequency magnetic signal 66 from ferromagnetic element 64 can be upconverted to a higher frequency band 69 through frequency modulation. The frequency modulation circuit configuration is depicted in FIG. 6, where $V_{IF}$ is the input lower frequency magnetic signal, and $V_{LO}$ indicates a high frequency local oscillating signal. $V_{LO}$ controls the alternative on/off state of the RF switch to pass $V_{IF}$ through. In effect, the RF switch 68 implements a mixer that performs frequency multiplication between $V_{IF}$ and $V_{LO}$. $V_{RF}$ is the resulting frequency modulation signal which has a much higher frequency than $V_{IF}$.

Still referring to FIG. 6 In between two ferromagnetic elements 64,67, an electrical controllable magnetic coupler 68 is inserted which functions as a switch to control the magnetic field propagation 66. The coupler 68 is designed with a special ferromagnetic material (patterned Permalloy) whose permeability can be tuned electrically through applied bias voltage and/or bias current, which in turn change the output magnetic field 69. By implementing an FPGA controller 61 and the conditioning circuit 63, the coupler's 68 input bias voltage and bias current can be adaptively changed to accomplish frequency modulation. It will be understood that FPGA 61 may be used as a digital controller discussed earlier. It should also be understood FPGA 61 can be extended to any other control circuit, like microprocessor, microcontroller, or other digital circuit.

Figure 7:
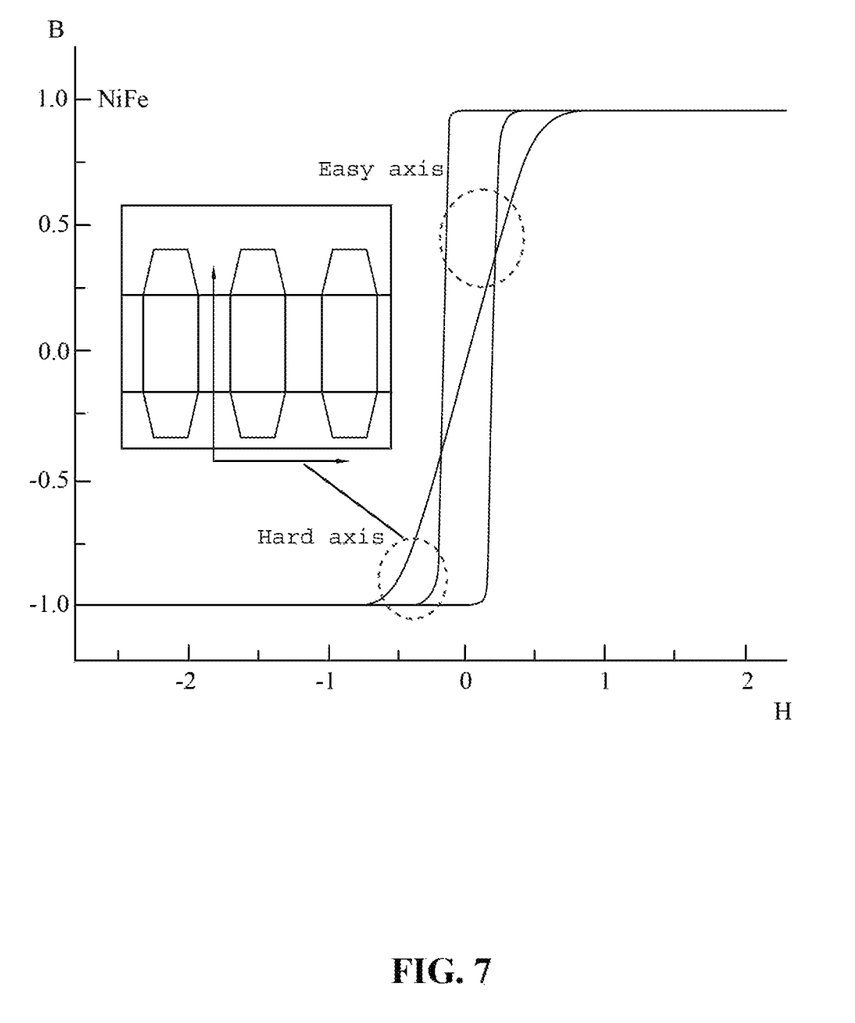
FIG. 7 is a B-H curve of PY material used in accordance with the present invention.
Figure 11:
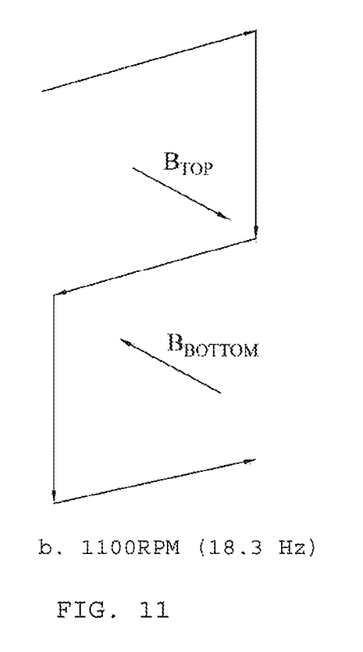
FIG. 11 is an illustration of oscillating current flow in the Z-antenna shown in FIG. 10.

Referring also to FIG. 7 there is shown a B-H curve of PY material used in the coupler 68 accordance with the present invention. The orientation of PY patterns related to signal line has been studied and tuning results are shown in FIG. 11. Here, thick PY thin film (>100 μm) will be deposited using electroplating method and patterned with standard photo-lithography technology, a gold layer will be first deposited and patterned underneath PY to provide bias path. DC current is applied through the gold metal line and different direction of magnetic field will be generated by changing the direction of the applied DC current at the assigned frequency.

Figure 8:
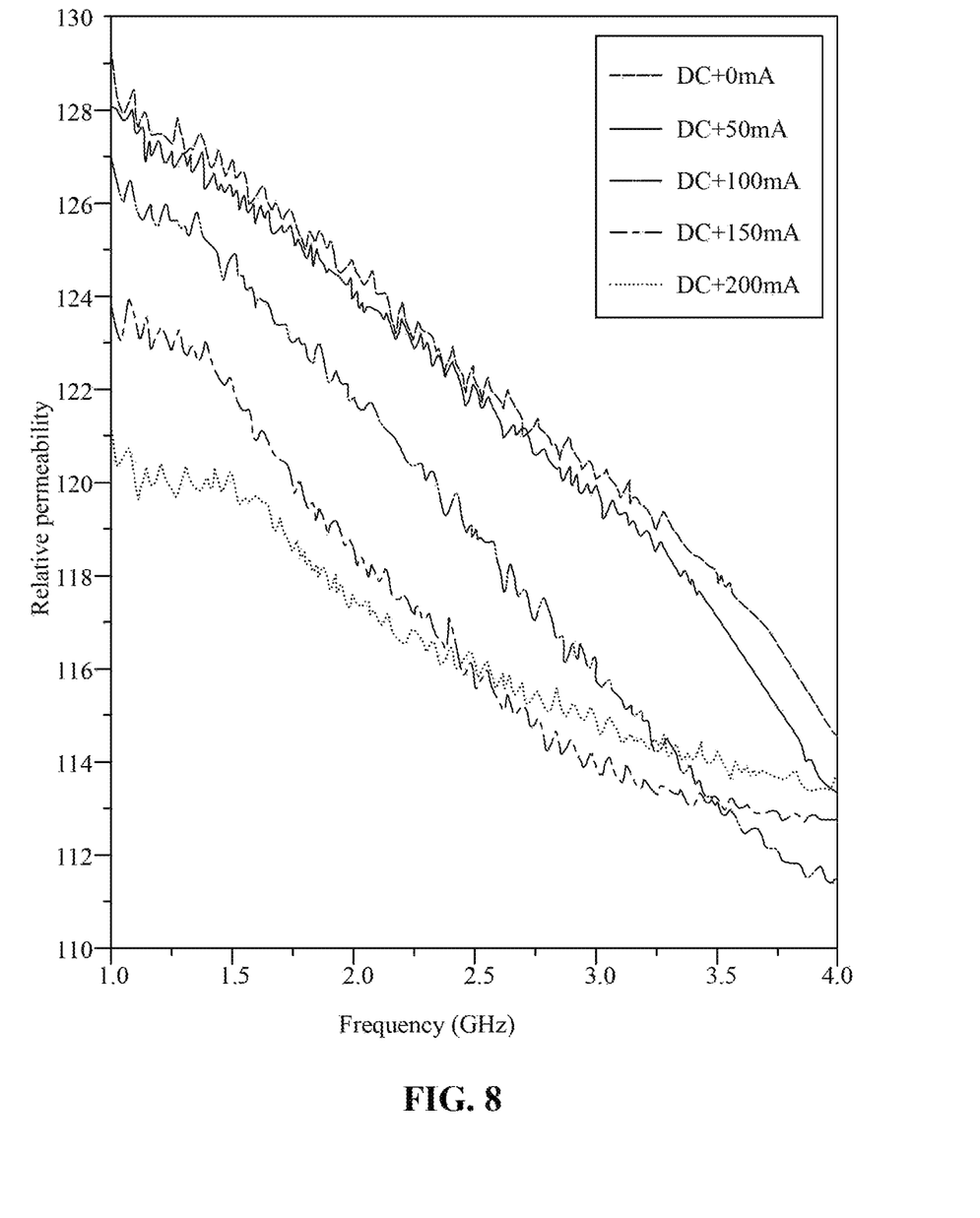
FIG. 8 is a graphical representation of relative permeability vs. frequency of PY material used in accordance with the present invention.
Figure 9:
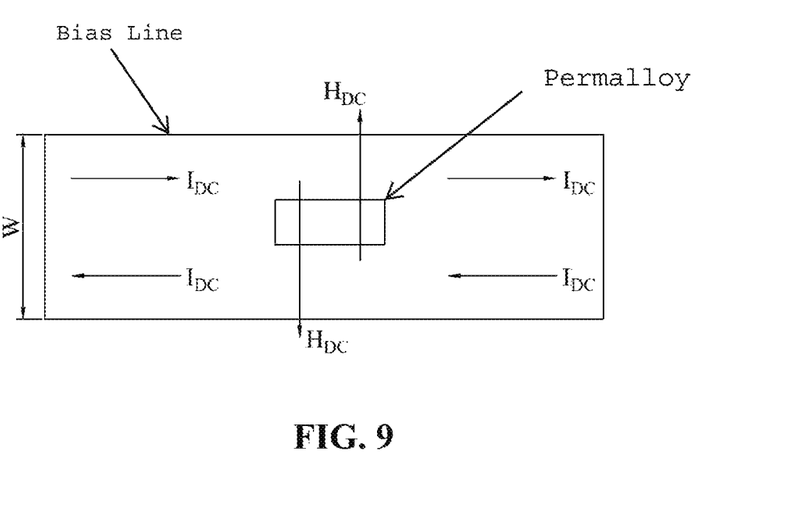
FIG. 9 is a pictorial illustration of a PY coupler shown in FIG. 6.

Referring also to FIG. 8 there is shown a graphical representation of relative permeability vs. frequency of PY material used in accordance with the present invention. FIG. 9 is a pictorial illustration of a PY coupler used in accordance with the present invention.

Figure 10:
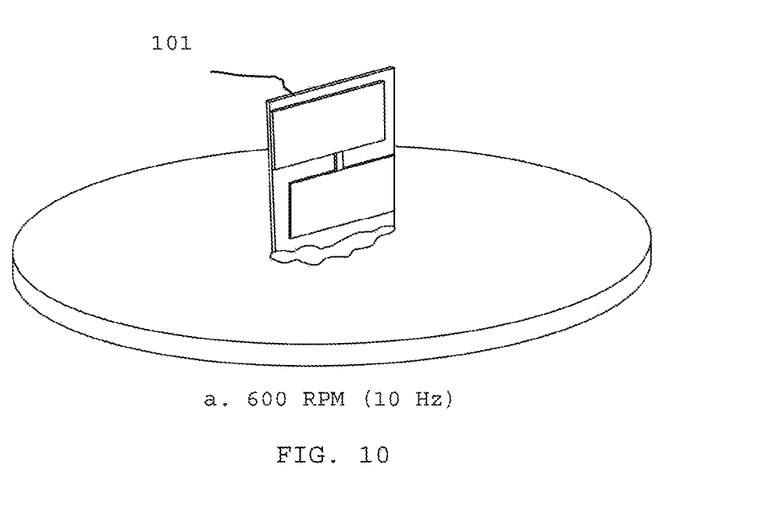
FIG. 10 is an illustration of a metamaterial Z-shaped antenna for coupling projected magnetic fields into the radiation field.
Figure 12:
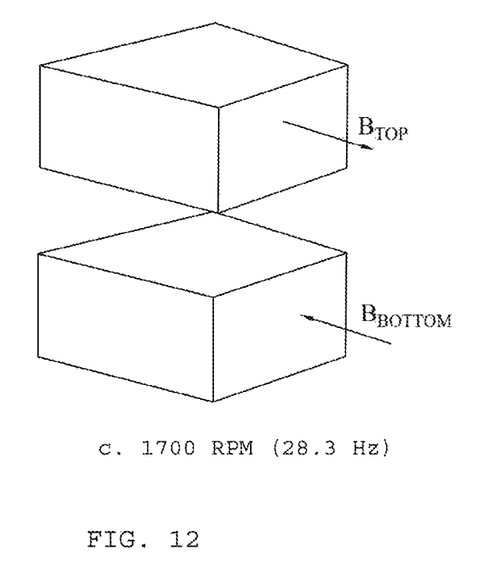
FIG. 12 is a diagram of two modular antennas with 180 degree phase shift producing the same magnetic dipole.

Referring also to FIG. 10 there is shown an illustration of a metamaterial Z-shaped antenna 101 for coupling projected magnetic fields into the radiation field. A nominal RPM for the Z-shaped antenna 101 is 600 RPM (10 Hz). The modular magnetic oscillators 10 can facilitate this coupling through geometric arrangements and phase synchronization. FIG. 11 is an illustration of oscillating current flow in the Z-antenna shown in FIG. 10; and FIG. 12 is a diagram of two modular antennas with 180-degree phase shift producing the same magnetic dipole.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

What is claimed is:

1. A vibrating magnetic antenna (VMA), the VMA comprising:
    a magnetic shuttle;
    a Y-configured stator assembly, wherein the Y-configured stator assembly comprises:
        a pair of first stators;
        a second stator, wherein the second stator is positioned relative to the pair of first stators to form a Y-configuration, and wherein the magnetic shuttle is adapted to travel linearly between the pair of first stators and the second stator, and wherein the pair of first stators and the second stator project alternating magnetic fields dependent upon the relative position of the magnetic shuttle.

2. The VMA as in claim 1 wherein the magnetic shuttle comprises a permanent magnet.

3. The VMA as in claim 1 wherein the magnetic shuttle comprises an array of permanent magnets.

4. The VMA as in claim 1 wherein the pair of first stators and the second stator comprises a soft magnetic material.

5. The VMA as in claim 4 wherein the soft magnetic material comprises a Permalloy.

6. The VMA as in claim 4 wherein the soft magnetic material comprises a soft magnetic composite.

7. The VMA as in claim 4 wherein the pair of first stators and the second stator each comprise a shaped stator for focusing magnetic flux lines.

8. The VMA as in claim 4 further comprising a shuttle driver.

9. The VMA as in claim 1 further comprising an electromagnetic frequency modulator for modulating the alternating magnetic fields, wherein the electromagnetic frequency modulator comprises:
    a ferromagnetic output element;
    an electrically tunable ferromagnetic coupler for coupling the alternating magnetic field to the ferromagnetic output element; and
    a controller for controlling the electrically tunable ferromagnetic coupler.

10. The VMA as in claim 1 further comprising a metamaterial Z-shaped antenna.

11. An oscillating magnetic antenna (OMA), the OMA comprising:
    at least one magnetic shuttle;
    a Y-configured stator assembly, wherein the Y-configured stator assembly comprises:
        a pair of first stators;
        a second stator, wherein the second stator is positioned relative to the pair of first stators to form a Y-configuration, and wherein the pair of first stators and the second stator comprises a soft magnetic material, and wherein the at least one magnetic shuttle is adapted to travel linearly between the pair of first stators and the second stator, and wherein the pair of first stators and the second stator project alternating magnetic fields dependent upon the relative position of the at least one magnetic shuttle.

12. The OMA as in claim 11 wherein the at least one magnetic shuttle comprises a permanent magnet.

13. The OMA as in claim 11 wherein the soft magnetic material comprises a Permalloy.

14. The OMA as in claim 11 wherein the soft magnetic material comprises a soft magnetic composite.

15. The OMA as in claim 11 wherein the pair of first stators and the second stator each comprise a shaped stator for focusing projected magnetic flux lines.

16. The OMA as in claim 11 further comprising an electromagnetic frequency modulator for modulating the alternating magnetic fields, wherein the electromagnetic frequency modulator comprises:
    a ferromagnetic output element;
    an electrically tunable ferromagnetic coupler for coupling the alternating magnetic field to the ferromagnetic output element; and
    a controller for controlling the electrically tunable ferromagnetic coupler.

17. An alternating magnetic field modulator (AMFM), the AMFM comprising:
    a vibrating magnetic array for generating the alternating, magnetic field;
    a ferromagnetic output element;
    an electrically tunable ferromagnetic coupler for coupling the alternating magnetic field to the ferromagnetic output element; and
    a controller for controlling the electrically tunable ferromagnetic coupler.

18. The AMFM as in claim 17, wherein the vibrating magnetic array comprises:
    a magnetic shuttle;
    a Y-configured stator assembly, wherein the Y-configured stator assembly comprises:

a pair of first stators;

a second stator, wherein the second stator is positioned relative to the pair of first stators to form a Y-configuration, and wherein the magnetic shuttle is adapted to travel between the pair of first stators and, the second stator, and wherein the pair of first stators and the second stator project alternating magnetic fields dependent upon the relative position of the magnetic shuttle.

19. The AMFM as in claim 18 wherein the pair of first stators and the second stator comprises a soft magnetic material.

20. The AMFM as in claim 19 wherein the pair of first stators and the second stator each comprise a shaped stator for focusing, magnetic flux lines.

* * * * *